United States Patent [19]
Rakov

[11] Patent Number: 6,101,084
[45] Date of Patent: *Aug. 8, 2000

[54] CAPACITIVE ROTARY COUPLING

[76] Inventor: Mikhail A. Rakov, 1028 Marcussen Dr., Menlo Park, Calif. 94025

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,521

[22] Filed: Feb. 12, 1997

[51] Int. Cl.[7] ...................................................... H01G 4/28
[52] U.S. Cl. ................... 361/301.2; 361/298.1; 361/277; 361/303; 361/328
[58] Field of Search .................... 336/119, 120, 336/117; 361/277, 280, 281, 287, 289, 290, 292, 298.1, 299.1, 271, 278, 299.2–299.5, 298.3, 298.5, 298.4, 328

[56] References Cited

U.S. PATENT DOCUMENTS

| | | | |
|---|---|---|---|
| 2,894,231 | 7/1959 | Krasno | 336/120 |
| 3,348,181 | 10/1967 | Stromswold | 336/120 |
| 3,996,503 | 12/1976 | Ichikawa | 361/289 |
| 4,002,957 | 1/1977 | Weisbrod | 361/289 |
| 4,389,762 | 6/1983 | Reeves | 29/25.42 |
| 4,675,638 | 6/1987 | Szabo | 336/120 |
| 4,870,522 | 9/1989 | Lelandais | 360/108 |
| 4,897,592 | 1/1990 | Hyde | 322/2 |
| 4,953,057 | 8/1990 | Davidian | 361/289 |
| 5,347,256 | 9/1994 | Yumiki et al. | 336/120 |

FOREIGN PATENT DOCUMENTS

| | | | |
|---|---|---|---|
| 2 347 656 | 4/1974 | Germany | 336/120 |
| 62-208610 | 9/1987 | Japan | 336/120 |
| 2 167 233 | 5/1986 | United Kingdom . | |

OTHER PUBLICATIONS

Werner Leonhard, "Control of Electrical Drives", 2nd ed., *Springer* (1966), pp. 75–77 and pp. 155–177.

J.R. Hendershot Jr., T. Miller, "Design of Brushless Permanent–Magnet Motors", Magna Physics Publishing (1994), pp. 1–1 through 1–12.

Tak Kenjo, "Electrical Motors and their Controls", *Oxford University Press* (1994), pp. 87–96.

*Primary Examiner*—Kristine Kincaid
*Assistant Examiner*—Eric Thomas
*Attorney, Agent, or Firm*—Leo F. Costello

[57] ABSTRACT

A signal is transferred without brushes between rotatable and non-rotatable components of a machine. An input signal is applied to one of the components. An axially symmetrical electromagnetic field is generated in response to the input signal. The electromagnetic field is detected by the other component and an output signal is generated in response to the detected electromagnetic field. A rotating transformer couples an information signal or power from an auxiliary generator to an external device for processing. The rotating transformer includes a rotor assembly and a stator assembly. The rotor assembly includes a pair of rotor plates. The stator assembly includes a pair of stator plates and a pair of dielectrics. A dielectric is mounted to a stator plate and mounted adjacent and spaced apart from a corresponding rotor plate to form a capacitor between the stator plate and the rotor plate. A voltage signal is applied across the rotor plates to induce a voltage across the stator plate to thereby generate an output voltage signal. The output voltage signal may have a phase and amplitude proportional to the phase and amplitude of the input voltage signal.

13 Claims, 12 Drawing Sheets

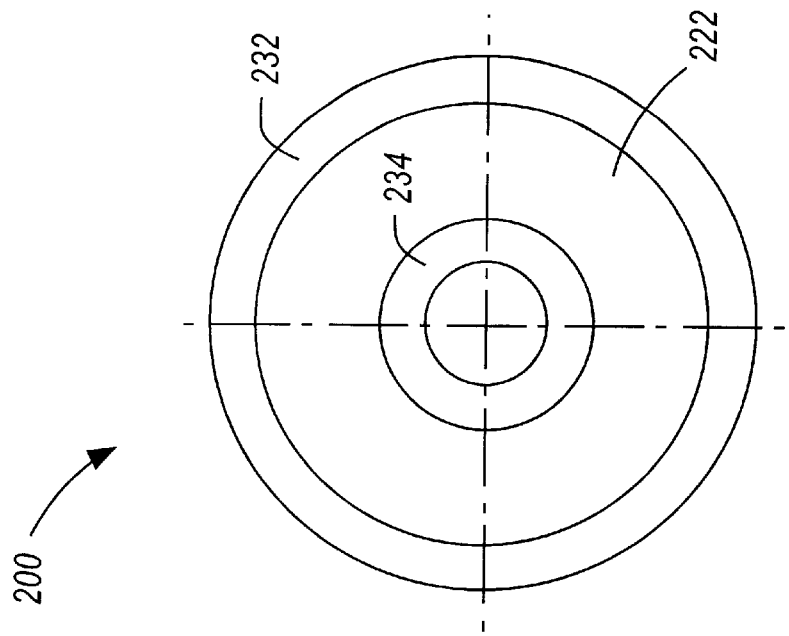
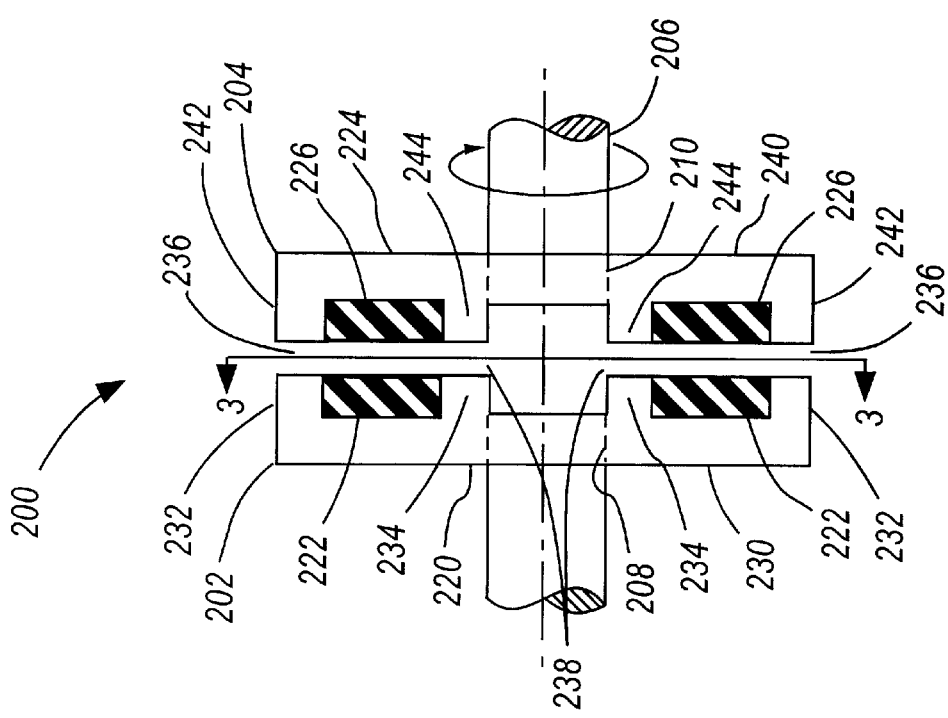
FIG. 3
FIG. 2

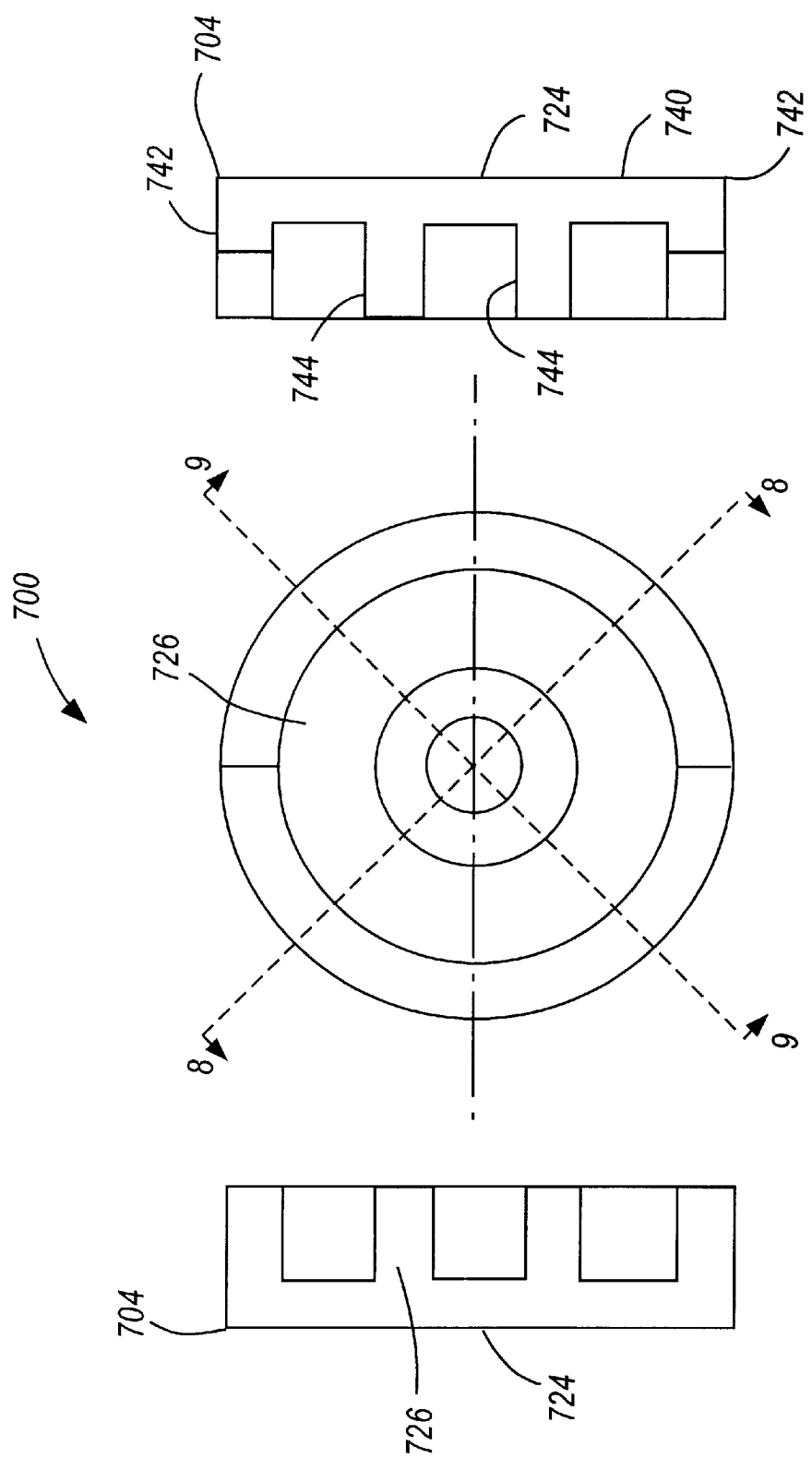

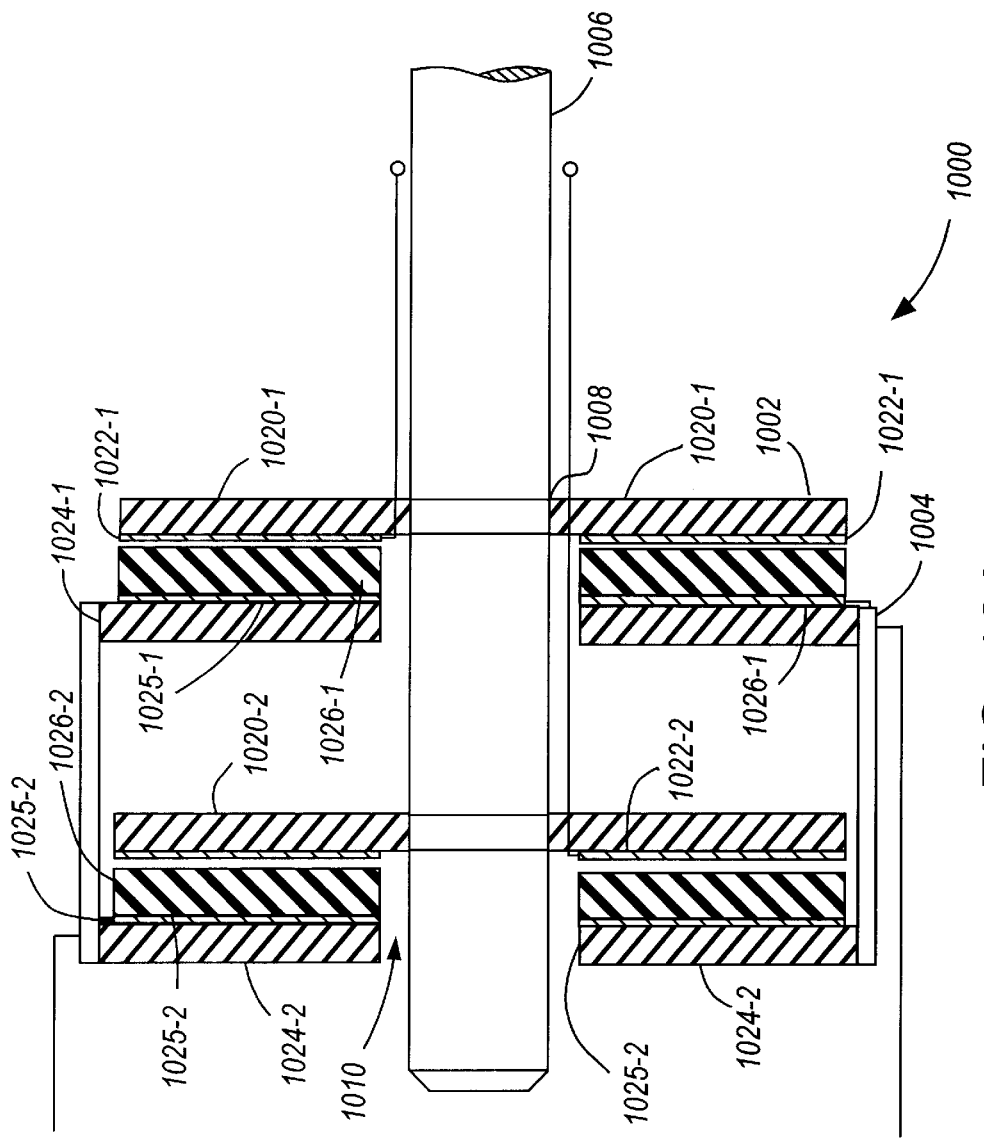

CAPACITIVE ROTARY COUPLING

FIELD OF THE INVENTION

This invention relates to transferring signals and power to and from an electric machine, and more particularly relates to transferring signals and power between moving and nonmoving parts of an electric machine using rotating transformers.

BACKGROUND OF THE INVENTION

Control of electrical drives requires determining the position and speed of a rotor. There are several ways to determine such parameters. First, the position of the rotor may be determined by an array of phototransistors and a special shutter coupled to the rotor shaft, or by using Hall-effect sensors. Such systems are described in T. Kenjo, *Electrical Motors and Their Controls*, Oxford University Press, (1994), 176 pp. Second, the speed signal may be obtained by using a small permanent magnet tachometer generator, attached to the drive, or by using magnetic or optical sensors generating pulses for each angular increment of the rotor. Such systems are described in W. Leonhard, *Control of Electrical Drives*, $2^{nd}$ ed., Springer (1966), 420 pp. Third, a resolver may determine the position of the rotor by a two-phase (sine/cosine) signal at a carrier frequency modulated sinusoidally by the rotation of the rotor. Such a system is described in J. R. Hendershot, Jr. and T. Miller, *Design of Brushless Permanent-Magnet Motors*, Magna Physics Publishing (1994), p. 1–19. These methods require precise mechanical placement of sensors or mechanical contact between moving parts.

It would be advantageous to deliver signals to or from the rotating parts of electrical machines without either mechanical or galvanic contact and complex sensor supporting systems.

SUMMARY OF THE INVENTION

The present invention provides a method for transferring signals and power between rotating and nonrotating components of an electric machine. In response to an input signal, one component of the transformer forms an electromagnetic field having axial symmetry wherein the axis of the electromagnetic field coincides with the axis of a rotating shaft of the electric machine. The electromagnetic field is applied to the other component of the transformer. In response to the electromagnetic field, the other component of the transformer forms an output signal proportional to the input signal both in amplitude and phase. The electromagnetic field may be a magnetic field or an electric field or a combination of both.

The present invention provides an apparatus comprising a shaft, a first winding assembly, and a second winding assembly. The first winding assembly includes a first magnetic core and a first winding. The first magnetic core has a first base, a first outer member mounted to and extending outwardly from a first surface of the first base, and has a first inner member mounted to and extending outwardly from the first surface of the first base between the first outer member and the center of the first surface of the first base. The first winding is disposed adjacent the first surface of the first base between the first outer and inner members. The second winding assembly includes a second magnetic core and a second winding. The second magnetic core has a second base, a second outer member mounted to and extending outwardly from a first surface of the second base, and has a second inner member mounted to and extending outwardly from the first surface of the second base between the first outer member and a center of the first surface of the second base. The second winding is disposed adjacent the first surface of the second base between the second outer and inner members. The second outer member is mounted adjacent to and spaced apart from the first outer member to form the first gap between the members. The second inner member is mounted adjacent to and spaced apart from the first inner member to form a second gap between the members for providing a magnetic flux path between the first and second winding assembly when the one of the windings produces a magnetic field. The first and second members may be annularly shaped.

The present invention provides an apparatus that transfers signals and power between rotating and non-rotating components of an electric machine. The apparatus comprises a shaft, a rotor assembly, and a stator assembly. The rotor assembly includes first and second rotor plates. The rotor assembly is mounted to the shaft so that the rotor assembly rotates in response to rotation of the shaft. The first and second rotor plates are mounted to the rotor assembly. The stator assembly includes first and second stator plates and first and second dielectrics. The first and second stator plates are mounted adjacent to and spaced apart from the first and second rotor plates, respectively. The first and second dielectrics are mounted to the first and second stator plates, respectively, between the respective stator plate and the respective first and second rotor plates. The dielectrics are spaced apart from respective rotor plates. The first dielectric, the first rotor plate, and the first stator plate form a first capacitor. The second dielectric, the second rotor plate, and the second stator plate form a second capacitor. In response to a voltage applied across the first and second rotor plates, an induced voltage across the first and second stator plates generates an output signal. The output signal may be proportional in amplitude and phase to the phase and amplitude of the input voltage signal.

BRIEF DESCRIPTION OF THE DRAWINGS

FIG. 2 is a longitudinal cross sectional view of a rotating transformer in accordance with a first embodiment of the present invention.

FIG. 3 is a side plan view of the rotating transformer of FIG. 2.

FIG. 4b is an exploded longitudinal cross sectional view of the rotating transformer of FIG. 4a.

FIG. 5 is a side plan view of the rotating transformer of FIG. 4a.

FIG. 7 is a transverse cross sectional view of a rotating transformer in accordance with a fourth embodiment of the present invention.

FIGS. 8 and 9 are longitudinal cross sectional views of the rotating transformer of FIG. 7 along respective lines 8—8 and 9—9.

FIG. 10a is a longitudinal cross sectional view of a rotating transformer in accordance with a fifth embodiment of the present invention.

FIG. 10b is a schematic diagram illustrating the electrical circuit of the rotating transformer of FIG. 10a.

DETAILED DESCRIPTION OF THE PREFERRED EMBODIMENTS

Rotating transformers of the present invention transfer signals and power between rotating and non-rotating components of an electric machine using electromagnetic fields. The rotating transformers of FIGS. 2–9, described below, use a magnetic field and inductive coupling for such transfer. Specifically, the rotating transformers of FIGS. 2–9 operate as inductors connected in parallel using magnetic flux to transfer signals and power between the components of the rotating transformers. Current is applied to one component and the resultant magnetic field induces a current in the other component. The rotating transformers of FIGS. 10–13, described below, use an electric field and capacitive coupling for such transfer.

Specifically, the rotating transformers of FIGS. 10–13 operate as capacitors connected in series using electric fields to transfer signals and power between components of the rotating transformers. A voltage is applied to one component and the resultant electric field generates a voltage in the second component for such transfer. Of course, the rotating transformers of the present invention may be used to transfer signal and power between rotating and non-rotating components of machines that have such components but are driven by a power source other than electric, such as gas.

Figure 1:
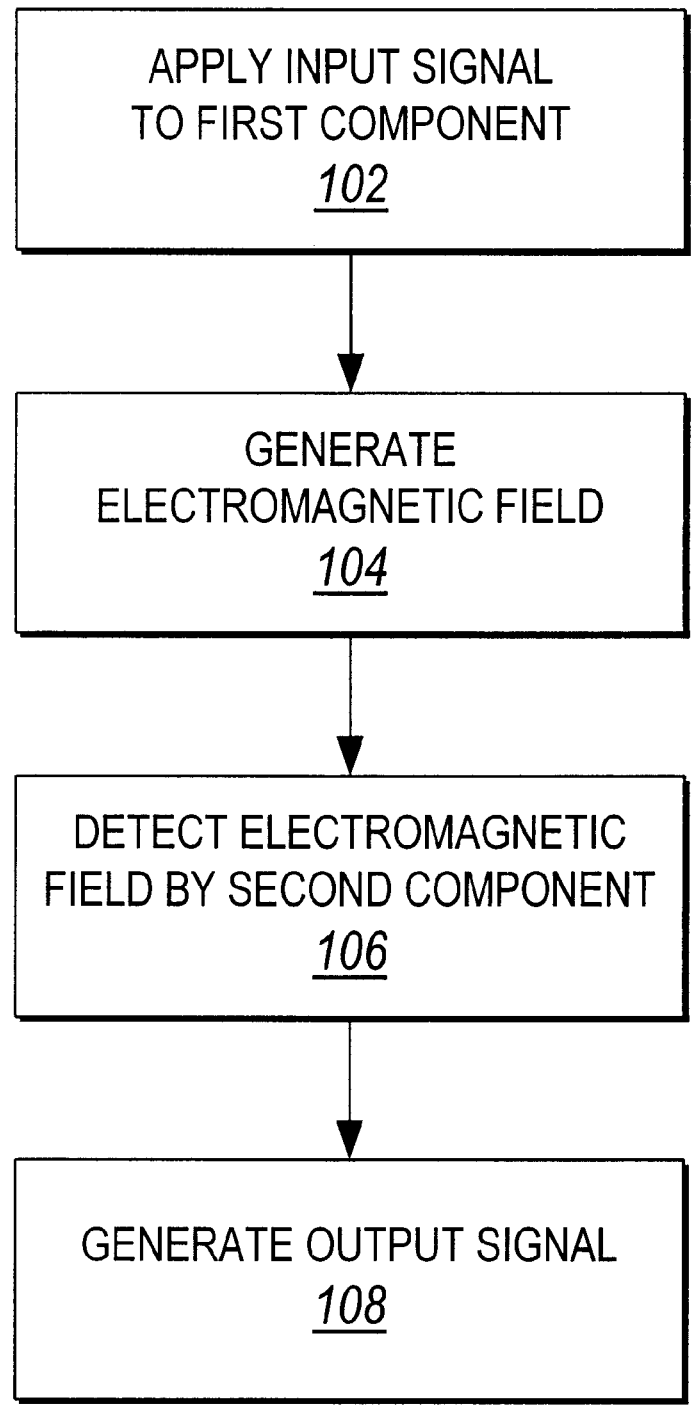
FIG. 1 is a flowchart illustrating the operation of a rotating transformer.

FIG. 1 is a flow chart illustrating the operation of a rotating transformer in accordance with the present invention. An input signal is applied 102 to a first component of a rotating transformer. The first component may be either a rotatable or non-rotatable component of the transformer. In one embodiment of the present invention, a rotor of an electric machine is rotatable and a stator of the electric machine is non-rotatable. In another embodiment of the present invention, the rotor is non-rotatable and the stator is rotatable. An electromagnetic field is generated 104 in response to the input signal. The electromagnetic field is axially symmetrical. In one embodiment of the present invention, the electromagnetic field has an axis coincident with the axis of the rotor and stator of the electric machine. In one embodiment of the present invention, the electromagnetic field has an axis coincident with the axis of a shaft of the electric machine. The electromagnetic field is detected 106 by a second component of the rotating transformer. In response to the detected electromagnetic field, an output signal is generated 108. In one embodiment of the present invention, the output signal is proportional to the input signal in both phase and amplitude.

Components of the rotating transformers of FIGS. 2–13 are shown exaggerated in size or disproportionate in relative size for clarity.

As described above, in one embodiment of the present invention, the rotating transformers may use a magnetic field to transfer signal and power between rotating and non-rotating components of the rotating transformer. Such rotating transformers use inductive coupling. FIGS. 2–9 are views illustrating rotating transformers using inductive coupling in accordance with the present invention.

FIG. 2 is a longitudinal cross sectional view of a rotating transformer 200 in accordance with the present invention. FIG. 3 is a side plan view of the rotating transformer 200 along line 3—3. The rotating transformer 200 includes a first winding assembly 202, a second winding assembly 204, and a shaft 206. The shaft 206 is mounted through a center hole 208 of the first winding assembly 202 and a center hole 210 of the second winding assembly 204. The first winding assembly 202 is mounted to the shaft 206 so that rotation of the shaft 206 causes the first winding assembly 202 to rotate correspondingly. On the other hand, the center hole 210 of the second winding assembly 204 is larger than the diameter of the shaft 206 so that the shaft 206 rotates freely within the center hole 210 without causing the second winding assembly 204 to rotate. Of course, the rotating transformer 200 may be modified so that the first winding assembly 204 is fixed and the second winding assembly 204 is mounted to the shaft 206 for rotation therewith.

The first winding assembly 202 includes a magnetic core 220 and a winding 222. The second winding assembly 204 includes a magnetic core 224 and a winding 226. The magnetic cores 220, 224 are formed of a magnetic permeable material.

The magnetic core 220 includes a base 230, an outer member 232, and an inner member 234. In one embodiment of the present invention, the base 230 is annularly shaped. The center hole 208 forms the center hole of the base 230. A first end of the outer member 232 is mounted to a first surface of the base 230. The outer member 232 extends outwardly from the base 230 toward a back end of the shaft 206. In one embodiment of the present invention, the outer member 232 has an annular shape. In another embodiment of the present invention, the outer member 232 is disposed along the periphery of the base 230. In one embodiment of the present invention, the outer member 232 extends outwardly substantially perpendicular to the first surface of the base 230. A first end of the inner member 234 is mounted to the first surface of the base 230 between the outer member 232 and the center hole 208. The inner member 234 extends outwardly from the first surface of the base 230 towards the back of the shaft 206. In one embodiment of the present invention, the inner member 234 has an annular shape. In another embodiment of the present invention, the inner member 234 is mounted along the periphery of the center hole 208. In one embodiment of the present invention, the inner member 234 extends outwardly substantially perpendicular to the first surface of the base 230.

The winding 222 is disposed adjacent the first surface of the base 230 between the outer member 232 and the inner member 234.

The magnetic core 224 includes a base 240, an outer member 242, and an inner member 244. In one embodiment of the present invention, the base 240 is annularly shaped. The center hole 210 forms the center hole of the base 240. A first end of the outer member 242 is mounted to a first surface of the base 240. The outer member 242 extends outwardly from the base 240 toward the front of the shaft 206. In one embodiment of the present invention, the outer member 242 has an annular shape. In another embodiment of the present invention, the outer member 242 is disposed along the periphery of the base 240. In one embodiment of the present invention, the outer member 232 extends outwardly substantially perpendicular to the first surface of the base 240. In another embodiment of the present invention, the outer members 232 and 242 each extend outwardly substantially at a first angle relative to a line perpendicular to the first surface of the respective bases 230 and 240.

A first end of the inner member 244 is mounted to the first surface of the base 240 between the outer member 242 and the center hole 210. The inner member 244 extends outwardly from the first surface of the base 240 towards the front of the shaft 206. In one embodiment of the present invention, the inner member 244 has an annular shape. In another embodiment of the present invention, the inner member 244 is mounted along the periphery of the center hole 210. In one embodiment of the present invention, the inner member 244 extends outwardly substantially perpendicular to the first surface of the base 240. In another embodiment of the present invention, the inner members 234, 244 each extend outwardly substantially at a second angle relative to a line perpendicular to the first surface of the respective bases 230 and 240.

The winding 226 is disposed adjacent the first surface of the base 240 between the outer member 242 and the inner member 244.

The second winding assembly 204 is mounted on the shaft 206 adjacent the first winding assembly 202 to form a gap 236 between the ends of the outer members 232, 242 distal to the first surface of the respective bases 250 and 240 and to form a gap 238 between ends of the inner members 234, 244 distal to the first surface of the respective bases 230 and 240.

An external source (not shown) applies an electrical current to one of the windings, for example, winding 222. As is well known, in response to the electrical current, the winding 222 generates a magnetic field that has closed magnetic flux lines. The magnetic flux within the magnetic cores 220 and 224 is greater than the magnetic flux outside the rotating transformer 200. The linear dimensions of the gaps 236, 238 are selected to increase the magnetic flux within the magnetic cores 220 and 224 but to allow the shaft 206 and the first winding assembly 202 to rotate. The magnetic flux in the other winding (winding 226 in the example) induces an electrical current in the winding 226. The current is indicative of the applied electrical current. Because the second winding assembly 204 does not rotate, the rotating transformer 200 transfers signals and power from a rotating part of an electric machine to a nonrotating part of the electric machine.

In one embodiment of the present invention, the first and second winding assemblies 202 and 204, respectively, are axially symmetric, and generate an axially symmetric magnetic field.

The rotating transformer 200 transfers signals and power between a rotating part of an electric machine and a nonrotating part of the electric machine without brushes or mechanical contact. Because no mechanical contact is required, the transfer may occur at higher machine rotational speeds.

Figure 5:
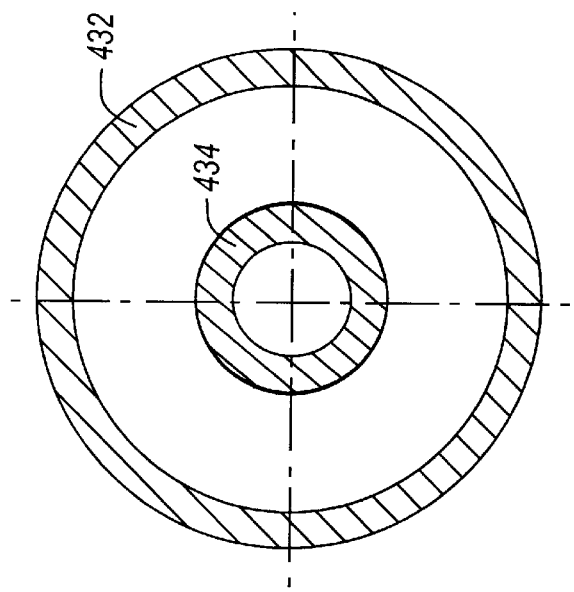
Figure 4A:
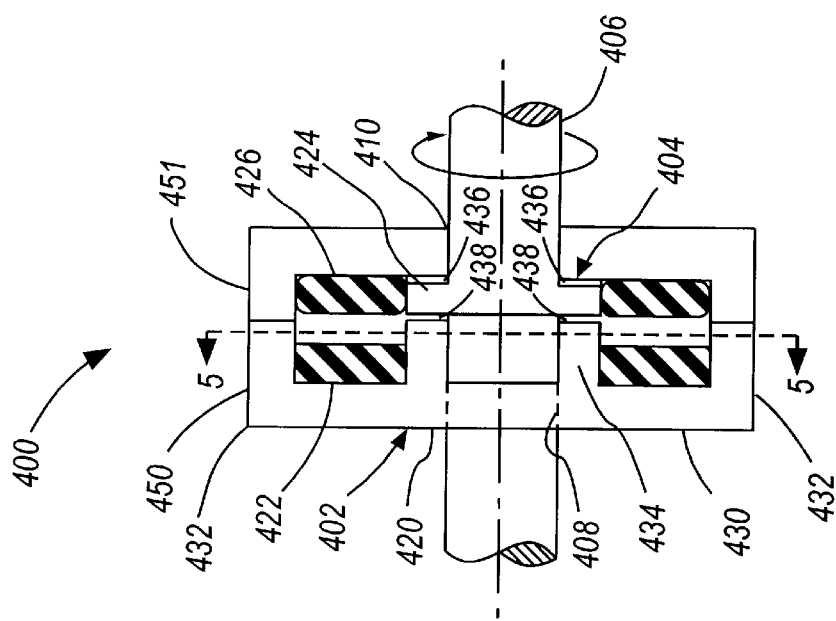
FIG. 4a is a longitudinal cross sectional view of a rotating transformer in accordance with a second embodiment of the present invention.
Figure 4B:
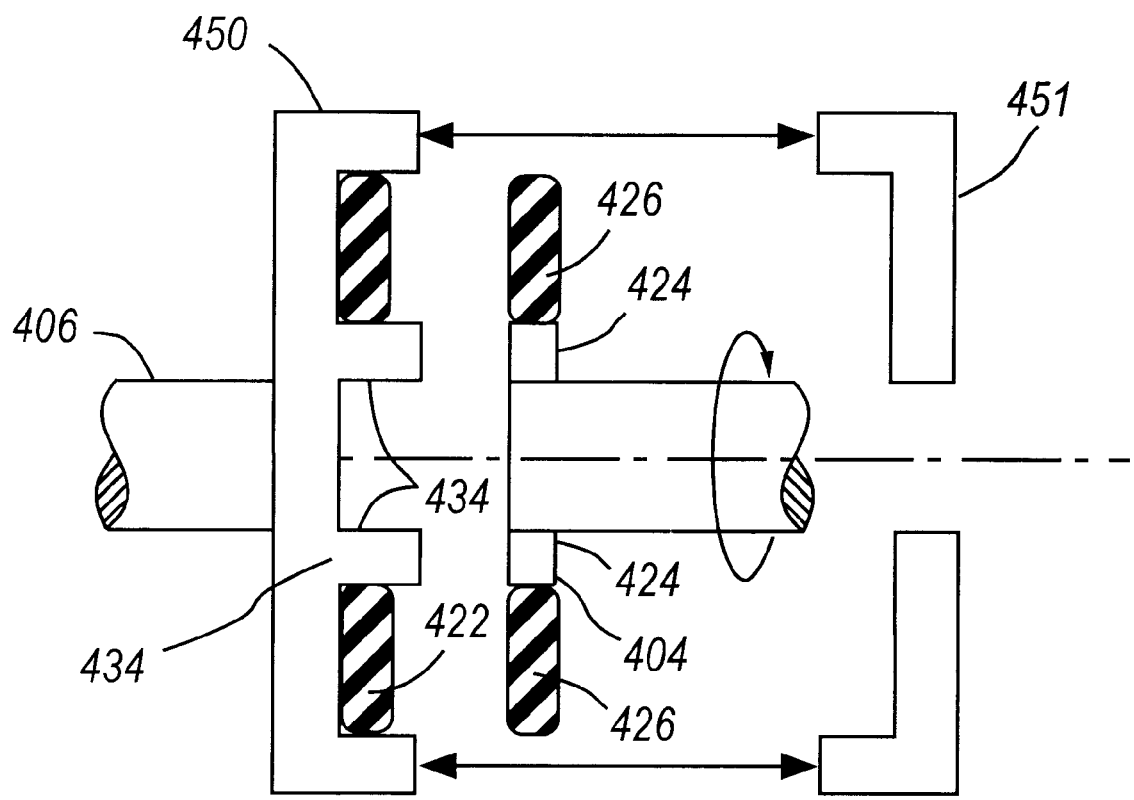
Figure 4C:
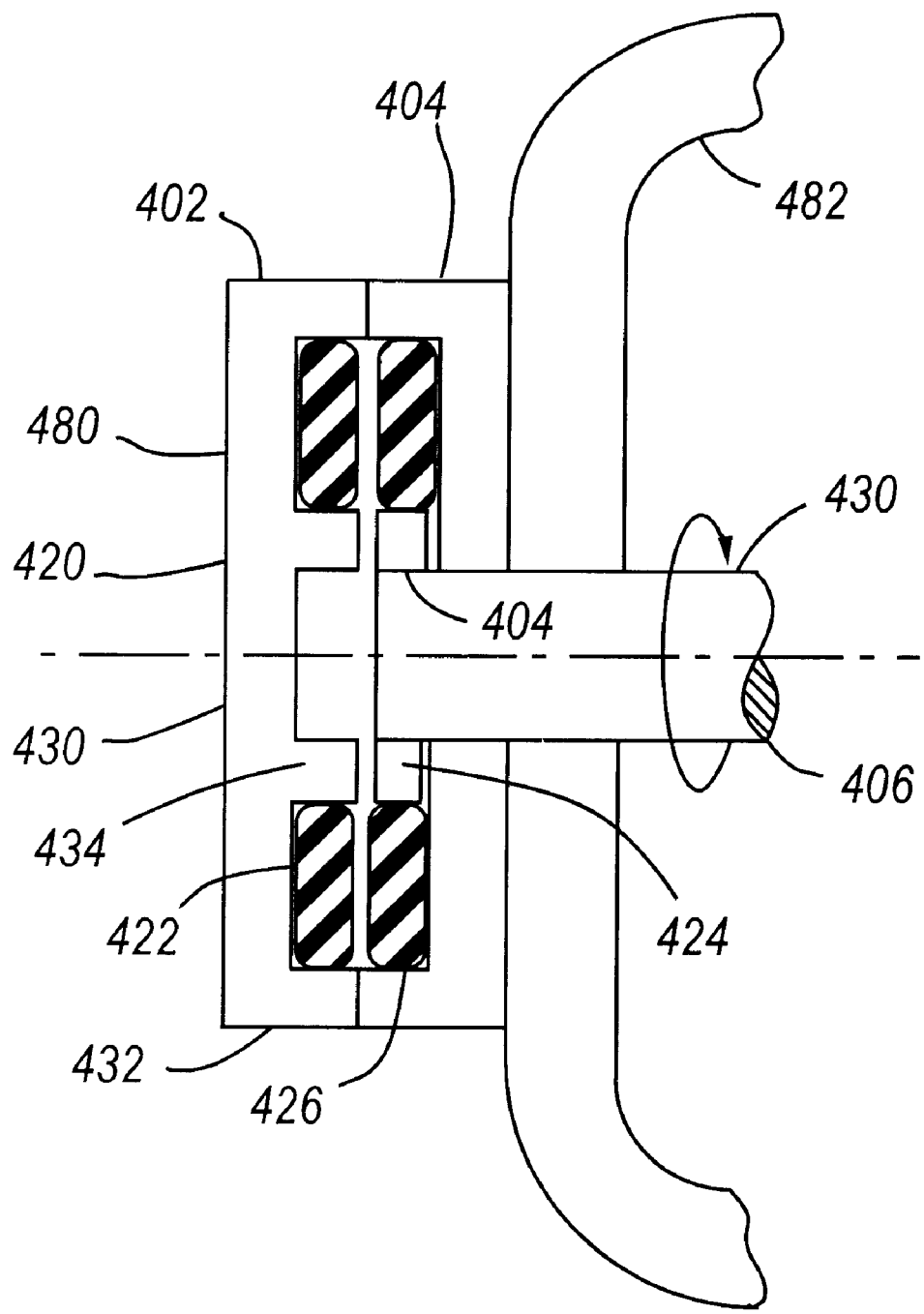
FIG. 4c is a longitudinal cross sectional view of the rotating transformer of FIG. 4a mounted to a rotor and a stator of a machine.

FIG. 4a is a longitudinal cross sectional view of a rotating transformer 400 in accordance with the present invention. FIG. 4b is an exploded longitudinal cross sectional view of FIG. 4a. FIG. 4c is a longitudinal cross sectional view of the rotating transformer 400 mounted to a rotor 480 and a stator 482 of a machine (not shown). FIG. 5 is a transverse cross sectional view of the rotating transformer 400 along line 5—5 of FIG. 4a. The rotating transformer 400 includes a first winding assembly 402, a second winding assembly 404, and a shaft 406. The shaft 406 is mounted through a center hole 408 of the first winding assembly 402 and through a center hole 410 of the second winding assembly 404. The first winding assembly 402 is mounted to the shaft 406 so that rotation of the shaft 406 causes the first winding assembly 402 to rotate correspondingly. The center hole 410 on the second winding assembly 404 is larger than the diameter of the shaft 406 so that the shaft 406 rotates freely within the center hole 410 and the second winding assembly 404 does not rotate as the shaft 406 rotates. Of course, the rotating transformer 400 may be modified so that the first winding assembly 402 is fixed and the second winding assembly 404 is mounted to the shaft 406 for rotation therewith. This embodiment of the present invention is shown in FIG. 4c in which the shaft 406 is part of the rotor 480. The second winding assembly 404 is mounted to the shaft 406 and correspondingly to the rotor 480. The first winding assembly 402 is connected to the stator 482 and does not rotate. As the rotor 480 rotates, the second winding assembly 404 rotates within the rotating transformer 400.

The first winding assembly 402 includes a magnetic core 420 and a winding 422. The second winding assembly 404 includes a magnetic core 424 and a winding 426. The magnetic cores 420, 424 are formed of a magnetic permeable material.

The magnetic core 420 includes a base 430, an outer member 432, and an inner member 434. The center hole 408 forms the center hole of the base 430. Each side of the outer member 432 has an L cross sectional shape. The outer member 432 is formed of an annular section 450 and a section 451. The section 451 may be attached to the section 450 by an adhesive. A first end of the outer member 432 is mounted to a first surface of the base 430. The outer member 432 extends outwardly from the base 430 toward a back end of the shaft 406. A second end of the outer member 432 is mounted spaced apart from the shaft 406. A first end of the inner member 434 is mounted to the first surface of the base 430 between the outer member 432 and the center hole 408. The inner member 434 extends outwardly from the first surface of the base 430 toward the back of the shaft 406. The outer member 432 and the inner member 434 form a closed housing having an annular shaped opening along the shaft 406 and having a chamber therein.

The second winding assembly 404 is mounted on the shaft 406 in the chamber formed by the outer member 432 and the inner member 434. The magnetic core 424 is annular. The winding 426 is disposed on the magnetic core 424 in the chamber.

The magnetic core 424 is mounted adjacent the inner member 434 to form a gap 438 between the end of the inner member 434 opposite the surface of the base 430 and the front end of the magnetic core 424 and to form a gap 436 between the distal end of the outer member 432 and the back side of the magnetic core 424. An electrical current applied to one of the windings 422, 426 produces a magnetic field that has flux lines that form a closed loop through the magnetic cores 420, 424 and through the gaps 436 and 438.

In one embodiment of the present invention, the first and second winding assemblies 402 and 404, respectively, are axially symmetric, and generate an axially symmetric magnetic field.

Figure 6:
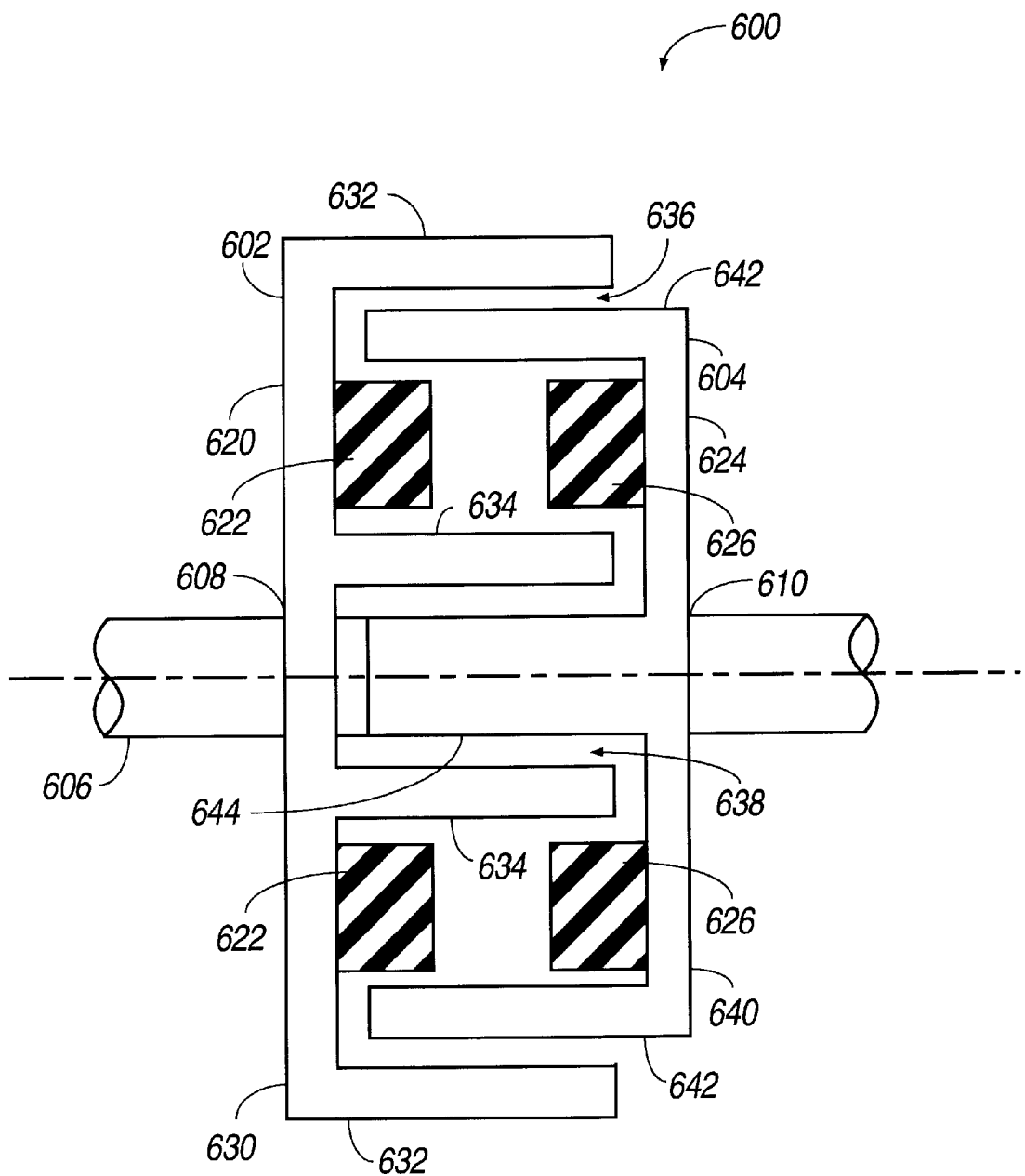
FIG. 6 is a longitudinal cross sectional view of a rotating transformer in accordance with a third embodiment of the present invention.

FIG. 6 is a longitudinal cross sectional view of a rotating transformer 600 in accordance with the present invention. The rotating transformer 600 includes a first winding assembly 602, a second winding assembly 604, and a shaft 606.

The shaft 606 is mounted through a center hole 608 of the first winding assembly 602 and through a center hole 610 of the second winding assembly 604. The first winding assembly 602 is mounted to the shaft 606 so that rotation of the shaft 606 causes the first winding assembly 602 to rotate correspondingly. The center hole 610 on the second winding assembly 604 is larger than the diameter of the shaft 606 so that the shaft 606 rotates freely within the center hole 610. Of course, the rotating transformer 600 may be modified so that the first winding assembly 604 is fixed and the second winding assembly 606 is mounted to the shaft 606 for rotation therewith.

The first winding assembly 602 includes a magnetic core 620 and a winding 622. The second winding assembly 604 includes a magnetic core 624 and a winding 626. The magnetic cores 620, 624 are formed of a magnetic permeable material.

The magnetic core 620 includes a base 630, an outer member 632, and an inner member 634. The center hole 608 forms the center hole of the base 630. A first end of the outer member 632 is mounted to a first surface of the base 630 at a first distance from the center axis of the shaft 606. The outer member 632 extends outwardly from the base 630 toward a back end of the shaft 606. In one embodiment of the present invention, the outer member 632 has an annular shape. In another embodiment of the present invention, the outer member 632 is disposed along the periphery of the base 630. A first end of the inner member 634 is mounted to the first surface of the base 630 between the outer member 632 and the center hole 608 at a second distance from the center of the shaft 606. The inner member 634 extends outwardly from the first surface of the base 630 toward the back of the shaft 606. The winding 622 is disposed adjacent the first surface of the base 630 between the outer member 632 and the inner member 634.

The magnetic core 624 includes a base 640, an outer member 642, and an inner member 644. In one embodiment of the present invention, the base 640 is annularly shaped. The center hole 610 forms the center hole of the base 640. A first end of the outer member 642 is mounted to a first surface of the base 640 at a third distance from the center of the shaft 606. The outer member 642 extends outwardly from the base 640 toward the front of the shaft 606. In one embodiment of the present invention, the outer member 642 has an annular shape. In another embodiment of the present invention, the outer member 642 is disposed along the periphery of the base 640. In one embodiment of the present invention, the third distance is less than the first distance so that the outer member 642 is inside the outer member 632. In another embodiment of the present invention, the third distance is greater than the first distance so that the outer member 642 is outside the outer member 632.

A first end of the inner member 644 is mounted to the first surface of the base 640 between the outer member 642 and the center hole 610 at a fourth distance from the center of the shaft 606. The inner member 644 extends outwardly from the first surface of the base 640 toward the front of the shaft 606. In one embodiment of the present invention, the inner member 644 has an annular shape. In another embodiment of the present invention, the inner member 644 is mounted along the periphery of the center hole 610. In one embodiment of the present invention, the second distance is greater than the fourth distance so that the inner member 644 is outside the inner member 634. In another embodiment of the present invention, the second distance is less than the fourth distance so that the inner member 644 is inside the inner member 634. The winding 626 is disposed adjacent the first surface of the base 640 between the outer member 642 and the inner member 644. In one embodiment of the present invention, the winding 626 is disposed on the first surface of the base 640.

The distances are selected so that the outer member 632 and the outer member 642 form a gap 636 there between along the length of the respective members. Likewise, the inner member 634 and the inner member 644 form a gap 638 there between along the length of the members 634, 644.

Electrical current applied to one of the windings 624, 636 produces a magnetic field that has flux lines that form a closed loop between the magnetic cores 620 and 624 and through the gaps 636 and 638 to produce a current in the other winding.

In one embodiment of the present invention, the first and second winding assemblies 602 and 604, respectively, are axially symmetric, and generate an axially symmetric magnetic field.

FIG. 7 is a transverse cross sectional of a rotating transformer 700 in accordance with the present invention. FIGS. 8 and 9 are longitudinal cross sectional views of the rotating transformer 700 along respective lines 8—8 and 9—9 of FIG. 7. The rotating transformer 700 includes a part of winding assemblies 704 disposed on a shaft (not shown) in a manner similar to the rotating transformer 200 (FIG. 2) except that the pair 20 of winding assemblies 704 replaces the first and second winding assemblies 202 and 204.

Each winding assembly 704 includes a magnetic core 724 and a winding 726. The magnetic core 724 is formed of a magnetic permeable material.

The magnetic core 724 includes a base 740, an outer member 742, and an inner member 744. In one embodiment of the present invention, the base 740 is annular shaped. A first end of the outer member 742 is mounted to a first surface of the base 740. The outer member 702 extends outwardly from the base 740 towards the front of the shaft (not shown). In one embodiment of the present invention, the outer member 742 has an annular shape, except that the height of the outer member varies with rotational position about the longitudinal axis of the base 740. In one embodiment of the present invention, along the line 8—8, the height or axial dimension of the outer member 742 equals the height of the inner member 744. Along the line 9—9, the height or axial dimension of the outer member 742 is less than the height or axial dimension of the inner member 744. In one embodiment of the present invention, the outer member 742 is divided into four quadrants diametrically opposed with quadrants having equal heights or axial dimension. As one of the winding assembly assemblies 704 rotates, the gap between the outer member 742 of the corresponding magnetic winding 704 is greater opposite the shorter height outer members 742.

The changing dimension of the gap changes the magnetic flux lines and thus changes the current induced on the other winding. This allows an alternating current to be generated from a direct current.

As described above, in one embodiment of the present invention, the rotating transformer may use an electric field to transfer signal and power between rotating and non-rotating components of the electric machine. Such rotating transformers use capacitive coupling. Because they use capacitive coupling, such rotating transformers do not require windings. Because windings typically require small wires, using windings in small machines may be difficult. Accordingly, rotating transformers using capacitive coupling are very convenient for implementations using modern integrated circuit technology, such as micromachines. FIGS. 10–13 are views illustrating rotating transformers using capacitive coupling in accordance with the present invention.

FIG. 10a is a longitudinal cross sectional view of a rotating transformer 1000 in accordance with the present invention. The rotating transformer 1000 includes a rotor 1002, a stator 1004, and a rotor shaft 1006. The shaft 1006 is mounted through a center hole 1008 of the rotor 1002 and through a center hole 1010 of the stator 1004. The rotor 1002 is mounted to the shaft 1006 so that rotation of the shaft 1006 causes the rotor 1002 to correspondingly rotate. Conversely, the center hole 1010 of the stator 1004 is larger than the outer diameter of the shaft 1006 so that the shaft 1006 rotates freely within the center hole 1010 without causing the stator 1004 to rotate.

The rotor 1002 includes a pair of rotor plate supports 1020-1 and 1020-2 and a pair of rotor plates 1022-1 and 1022-2. In one embodiment of the present invention, the rotor plate supports 1020-1 and 1020-2 are annularly shaped. The center hole 1008 forms a center hole of the rotor plate supports 1020-1 and 1020-2. The rotor plate supports 1020 are formed of an electrical insulator. The rotor plates 1022-1 and 1022-2 are mounted on respective rotor plate supports 1020-1 and 1022-2 so that the rotor plates 1022 are not in electrical contact with the shaft 1006. The rotor plates 1022 are formed of a conductive material. The rotor plates 1022 thus are electrically insulated from the shaft 1006. Of course, if the shaft 1006 is formed of an electrical insulator, the rotor plates 1022 may contact the shaft 1006. In such an instance, the rotor plate support 1020 may be formed of a conductive material. In one embodiment of the present invention, the rotor plate support 1020 and the rotor plate 1022 are annularly shaped with an inner surface of a center hole of the rotor plate 1022 concentrically mounted to the outer surface of the rotor plate support 1020.

The stator 1004 includes a pair of stator plate supports 1024-1 and 1024-2, a pair of stator plates 1025-1 and 1025-2, and a pair of dielectrics 1026-1 and 1026-2. The stator plate supports 1024 are formed of an electrical insulator. The stator plates 1025-1 and 1025-2 are mounted to respective stator plate supports 1024-1 and 1024-2. The stator plates 1025 are formed of a conductive material. The stator plates 1025 are electrically insulated from the shaft 1006. The dielectrics 1026-1 and 1026-2 are mounted to respective stator plates 1025-1 and 1025-2 so that the corresponding stator plate 1025 is between the stator plate support 1024 and the dielectric 1026. In one embodiment of the present invention, the stator plates 1025 are annularly shaped. The dielectrics 1026 according to one embodiment of the present invention are annularly shaped. The stator 1004 is mounted spaced apart from the rotor 1002. The stator plates 1025-1 and 1025-2 are mounted adjacent the respective rotor plates 1022-1 and 1022-2 of the rotor 1002 so that the dielectic 1026-1 and 1026-2 is between the respective rotor plates 1022-1 and 1022-2 and the respective stator plates 1024-1 and 1024-2. The dielectic 1026 is spaced apart from the rotor plate 1022 so that the shaft 1006 and the rotor 1002 may rotate without mechanical contact between the stator 1004 and the rotor 1002. The rotor plate 1022-1, the stator plate 1025-1, and the dielectric 1026-1 form a first capacitor. Likewise, the rotor plate 1022-2, the stator plate 1025-2, and the dielectric 1026-2 form a second capacitor.

An external source (not shown) applies an electric voltage to the rotor plates 1022. This voltage generates an electric field across the capacitor formed by the stator 1004 and the rotor 1002 which induces an accumulation of electric charge on the stator plates 1025. The voltage difference between the stator plates 1025-1 and 1025-2 is indicative of the applied electric voltage to the rotor 1002. Because the stator 1004 does not rotate, the rotating transformer 1000 transfers signals and power between a rotating component of an electric machine and a non-rotating component of the electric machine.

Although only two capacitors are shown, the present invention is not so limited. The rotating transformer 1000, for example, may include more than two capacitors formed by the rotor plate 1022, the stator plates 1025, and the dielectrics 1026.

Figure 10B:
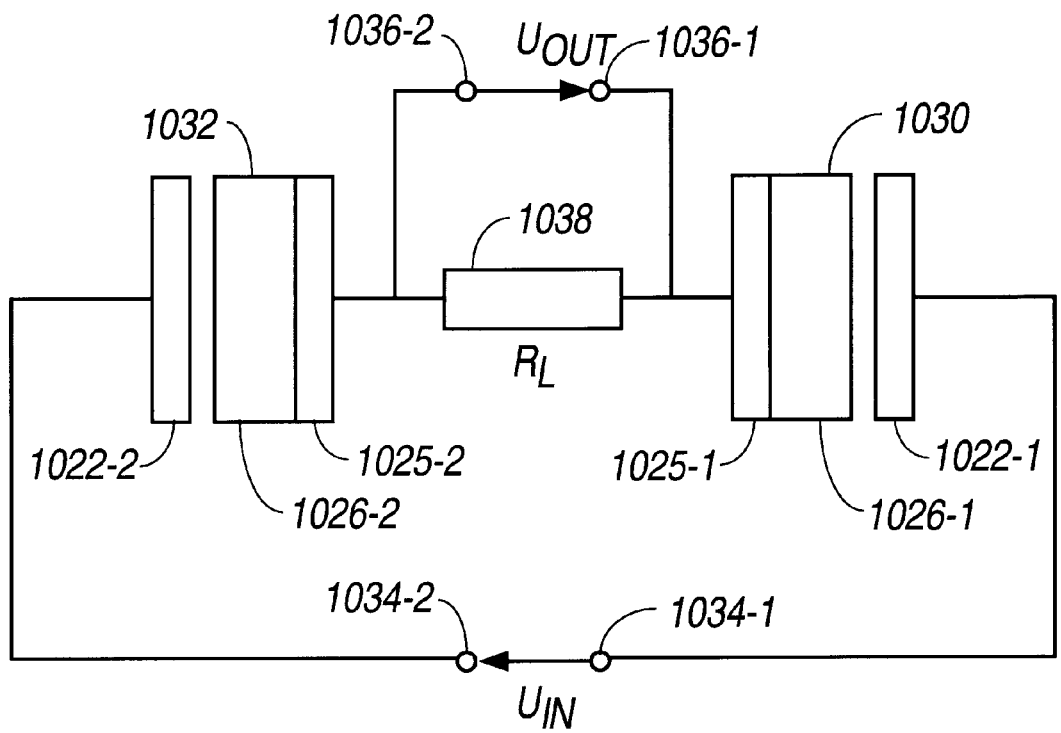

FIG. 10b is a schematic diagram illustrating the electrical circuit of the rotating transformer 1000. The rotating transformer 1000 may be represented by a pair of capacitors 1030 and 1032 connected between input terminals 1034-1 and 1034-2 and output terminals 1036-1 and 1036-2, and a load register 1038 coupled across the output terminals 1036-1 and 1036-2. The capacitor 1030 is representative of the rotor plate 1022-1, the stator plate 1025-1 and the dielectic 1026-1. Likewise, the capacitor 1032 is representative of the rotor plate 1022-2, the stator plate 1025-2 and the dielectic 1026-2.

In another embodiment of the present invention, the dielectrics 1026 are mounted to the rotor plates 1022 and are spaced apart from the stator plates 1025. In one embodiment of the present invention, the stator 1004 rotates, and the rotor 1002 does not rotate.

Figure 11:
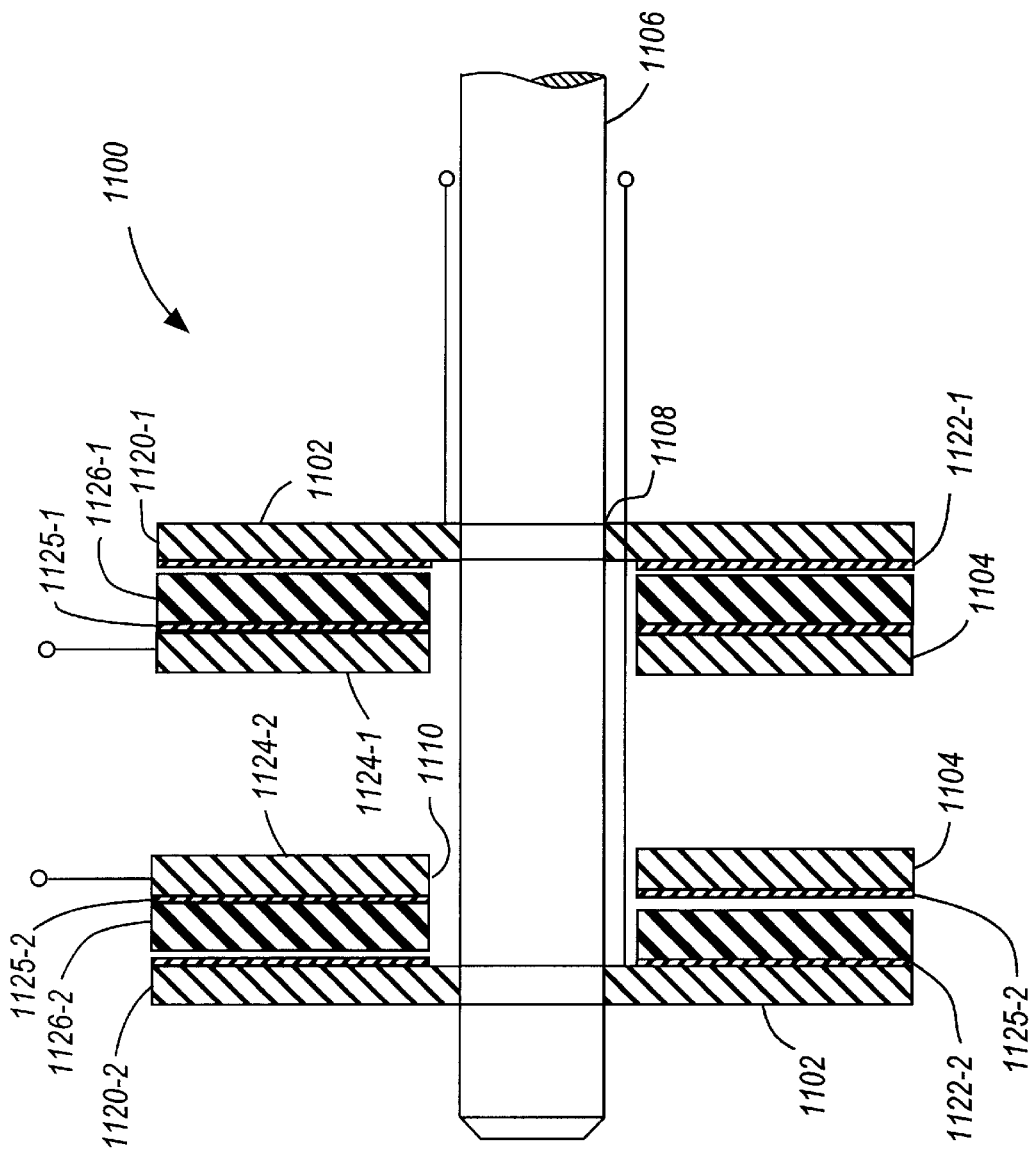
FIG. 11 is a longitudinal cross sectional view illustrating a rotating transformer in accordance with a sixth embodiment of the present invention.

FIG. 11 is a longitudinal cross sectional view of the rotating transformer 1100 in accordance with the present invention. The rotating transformer 1100 includes a rotor 1102, a stator 1104 and a shaft 1106. The rotating transformer 1100 is similar to the rotating transformer 1000 except the stator 1104 is between components of the rotor 1102. The shaft 1106 is mounted through a center hole 1108 of the rotor 1102 and through center hole 1110 of the stator 1104. The rotor 1102 is mounted to the shaft 1106 so that rotation of the shaft 1106 causes the rotor 1102 to rotate correspondingly. Conversely, the center hole 1110 of the stator 1104 is larger than the outer diameter of the shaft 1106 so that the shaft 1106 rotates freely within the center hole 1110 without causing the stator 1104 to rotate.

The rotor 1102 includes a pair of rotor plate supports 1120-1 and 1120-2 and a pair of rotor plates 1022-1 and 1022-2. In one embodiment of the present invention, the rotor plate supports 1120-1 and 1120-2 are annularly shaped. The center hole 1108 forms a center hole of the rotor plate supports 1120-1 and 1120-2. The rotor plate supports 1120 are formed of an electrical insulator. The rotor plates 1122-1 and 1122-2 are mounted to respective rotor plate supports 1120-1 and 1120-2 so that the rotor plates 1122 are not in electrical contact with the shaft 1106. The rotor plates 1122 are formed of a conductive material. The rotor plates 1122 thus are electrically insulated from the shaft 1106.

The stator 1104 includes a pair of stator plate supports 1124-1 and 1124-2, a pair of stator plates 1125-1 and 1125-2, and a pair of dielectrics 1126-1 and 1126-2. The stator plate supports 1124 are formed of an electrical insulator. The stator plates 1125-1 and 1125-2 are mounted to respective stator plate supports 1124-1 and 1124-2 adjacent and spaced apart from respective rotor plates 1122-1 and 1122-2. The stator plates 1125 are formed of a conductive material. The stator plates 1125 are electrically insulated from the shaft 1106. The dielectrics 1126-1, 1126-2 are mounted to respective stator plates 1125-1 and 1125-2 so that the corresponding stator plate 1125 is between the stator plate support 1124 and the dielectric 1126. In one embodiment of the present invention, the stator plates 1125 are annularly shaped. The dielectrics 1126 according to one embodiment of the present invention are annularly shaped.

The stator plates 1125-1 and 1125-2 are mounted adjacent the rotor plate supports 1120-1 and 1120-2 of the rotor 1102 so that the dielectric 1126-1, 1126-2 is between the respective rotor plate 1122-1 and 1122-2 and the stator plate 1124-1 and 1124-2. The stator 1104 is disposed between the rotor plate supports 1120-1 and 1120-2. The dielectric 1126 is spaced apart from the rotor plate 1122 so that the shaft 1106 and the rotor 1102 may rotate without mechanical contact with the stator 1104. The rotor plate 1122-1, the stator plate 1122-2, and the dielectric 1126-1 form a first capacitor. Likewise, the rotor plate 1122-2, the stator plate 1125-1, and the dielectric 1126-2 form a second capacitor.

An external source (not shown) applies an electric voltage to the rotor plates 1122. This voltage generates an electric field across the capacitor formed by the stator plates 1125 and the rotor plates 1122, which induces an accumulation of electric charge on the stator plates 1125. The voltage difference between the stator plates 1125-1 and 1125-2 is indicative of the applied electric voltage to the rotor plates 1022. Because the stator 1104 does not rotate and the rotor 1002 does rotate, the rotating transformer 1100 transfers signals and power between a rotating component of an electric machine and a non-rotating component of the electric machine.

Although only two capacitors are shown, the present invention is not so limited. The rotating transformer 1100, for example, may include more than two capacitors formed by the rotor plates 1122, the stator plates 1125 and the dielectrics 1126.

Figure 12:
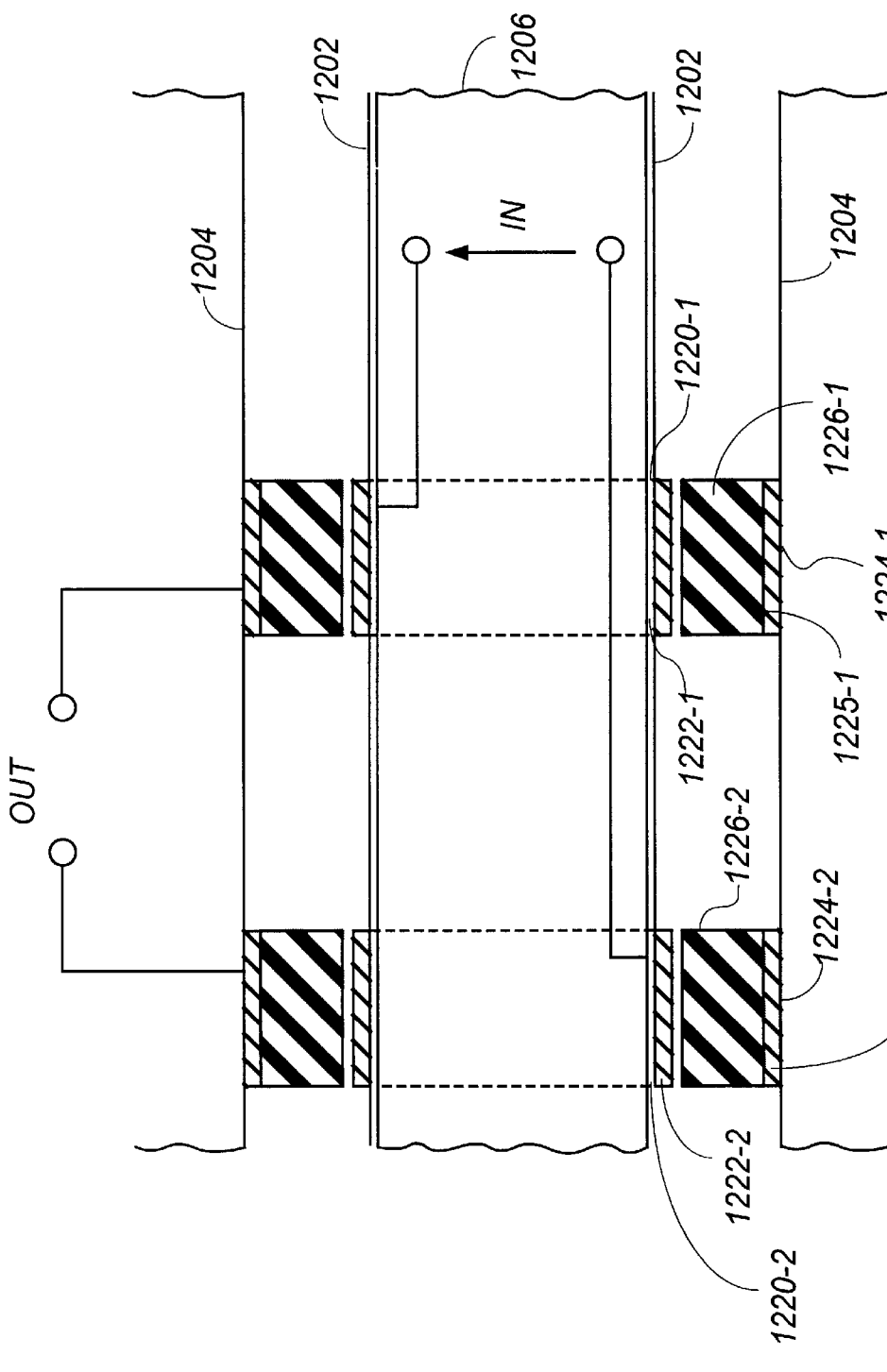
FIG. 12 is a longitudinal cross sectional view of a rotating transformer in accordance with a seventh embodiment of the present invention.

FIG. 12 is a longitudinal cross sectional view of a rotating transformer 1200 in accordance with the present invention. The rotating transformer 1200 includes a rotor 1202, a stator 1204 and a shaft 1206. The rotor 1202 is disposed on the outer surface of the shaft 1206. The rotor 1202 includes a pair of rotor plate supports 1220-1 and 1220-2 and a pair of rotor plates 1222-1 and 1222-2. The rotor plate supports 1220 are formed of an electric insulator. The rotor plates 1222 are formed of a conductive material. The pair of rotor plate supports 1220-1 and 1220-2 are disposed in a spaced apart relation on the surface of the shaft 1206. The rotor plates 1222 are disposed on an outer surface of the rotor plate supports 1220-1 and 1220-2 so that the corresponding rotor plate support 1220 is between the rotor plates 1222 and the shaft 1206 so that the rotor plates 1222 are electrically insulated from the shaft 1206. In one embodiment of the present invention, the rotor plates 1222 are annularly shaped. In one embodiment of the present invention, the rotor plates 1222 have a central axis that is substantially coincident with a central axis of the shaft 1206.

The stator 1204 includes a pair of stator plate supports 1224-1 and 1224-2, a pair of stator plates 1225-1 and 1225-2, and a pair of dielectrics 1226-1 and 1226-2. The stator plate supports 1224 are formed of an electrical insulator. In one embodiment of the present invention, the stator plate supports 1224 are tubular. The stator plates 1225-1 and 1225-2 are mounted to an inside wall of respective stator plate supports 1224-1 and 1224-2. The stator plates 1225 are formed of a conductive material. The stator plates 1225 are electrically insulated from the stator 1204. The dielectrics 1226-1 and 1226-2 are mounted to respective stator plates 1225-1 and 1225-2 so that the corresponding stator plate 1225 is between the stator plate support 1224 and the dielectric 1226. In one embodiment of the present invention, the stator plates 1225 are tubular. In one embodiment of the present invention, the dielectrics 1226 are tubular. The stator 1204 is concentrically mounted spaced apart from the rotor 1202. The stator plates 1225-1 and 1225-2 are mounted adjacent the respective rotor plates 1222-1 and 1222-2 of the rotor 1202 so that the dielectric 1226-1 and 1226-2 is between the respective rotor plates 1222-1 and 1222-2 and respective stator plates 1224-1 and 1224-2. In one embodiment of the present invention, the stator plates have a central axis that is substantially coincident with the central axis of the shaft 1206. In one embodiment of the present invention, the dielectrics 1226 have a central axis that is substantially coincident with the central axis of the shaft 1206.

The dielectric 1226 is spaced apart from the rotor plate 1222 so that the shaft 1206 and the rotor 1202 may rotate without mechanical contact between the stator 1204 and the rotor 1202. The rotor plate 1222-1, the stator plate 1225-1 and the dielectric 1226-1 form a first capacitor. Likewise, the rotor plate 1222-2, the stator plate 1225-2 and the dielectric 1226-2 form a second capacitor.

An external source (not shown) applies an electric voltage to the rotor plates 1222. This voltage generates an electric field across the capacitors formed by the stator plate 1204 and the rotor 1202, which induces an accumulation of electric charge on the stator plates 1225. The voltage difference between the stator plates 1225-1 and 1225-2 is indicative of the electric field applied to the rotor plates 1222. Because the stator 1204 does not rotate and the rotor 1202 does rotate, the rotating transformer 1200 transfers signals and power between a rotating component and a non-rotating component of an electric machine.

Although only two capacitors are shown, the present invention is not so limited. For example, a rotating transformer 1200 may include more than two capacitors formed by the rotor plates 1222, the stator plates 1225, and the dielectrics 1226.

Figure 13:
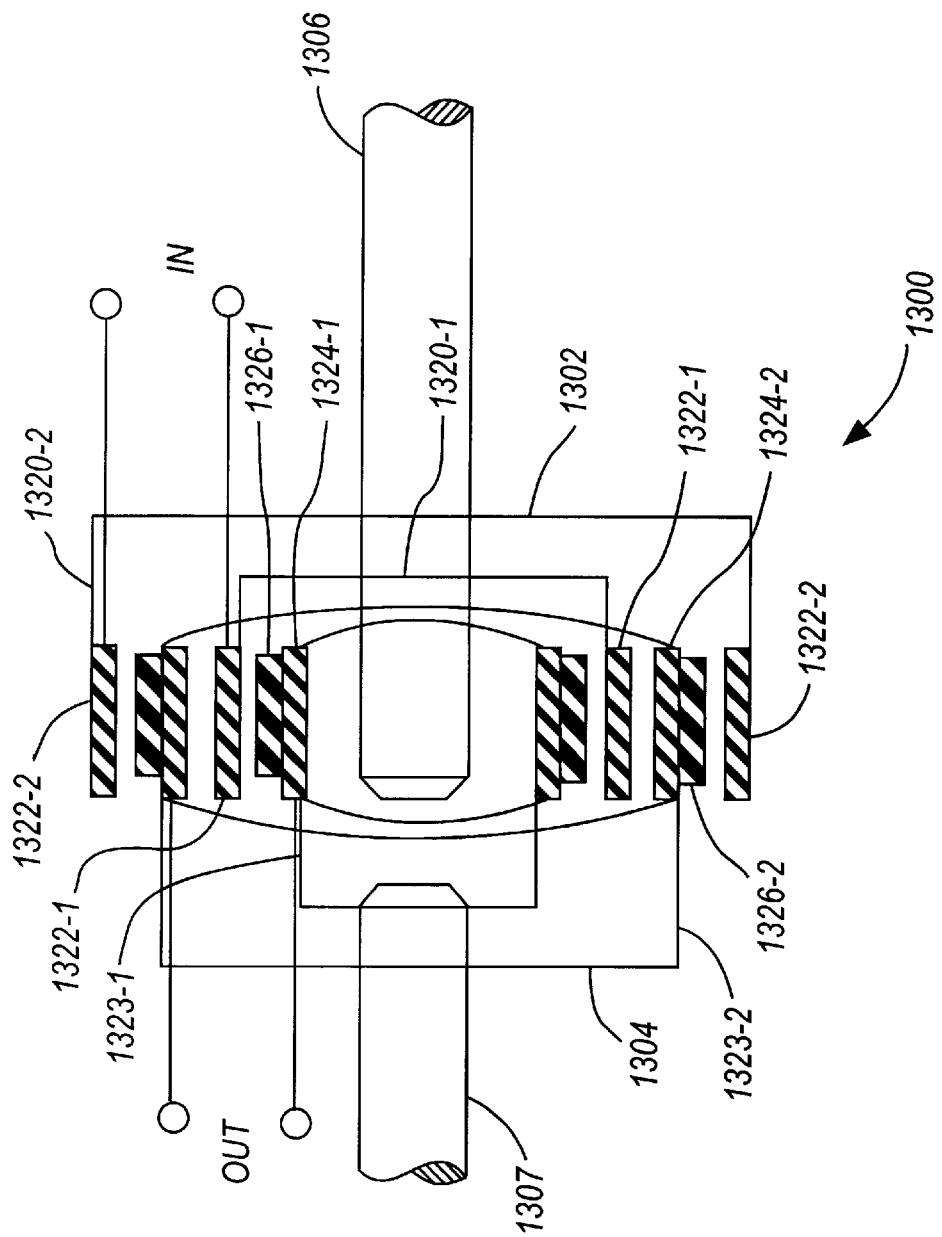
FIG. 13 is a longitudinal cross sectional view of illustrating an interleaved rotating transformer in accordance with an eighth embodiment of the present invention.

FIG. 13 is a longitudinal cross sectional view of an interleaved rotating transformer 1300 in accordance with the present invention. The interleaved rotating transformer 1300 includes a rotor 1302, a stator 1304 and shafts 1306 and 1307. The rotor 1302 comprises a pair of rotor plate supports 1320-1 and 1320-2 and a pair of rotor plates 1322-1 and 1322-2. The rotor plate supports 1320 are mounted to the shaft 1306 and extends outwardly from the shaft 1306. In one embodiment of the present invention, the rotor plate supports 1320 are tubular and include a thin annular wall on one end and a hole in the wall for engaging the shaft 1306. The rotor plates 1322-1 and 1322-2 are mounted on an inner surface of a tubular wall of the respective rotor plate support 1320-1 and 1320-2. In one embodiment of the present invention, the rotor plates 1322 are substantially perpendicular to the rotor plate support 1320. In one embodiment of the present invention, the rotor plates 1322 and the corresponding portion of the rotor plate supports 1320 that the rotor plate 1322 is mounted to are at an angle relative to the longitudinal axis of the shaft 1306. The rotor plate 1322-1 is at a first distance from the longitudinal axis of the shaft 1306 and the rotor plate 1322-2 is at a second distance from the longitudinal axis of the shaft 1306. The second distance is greater than the first distance.

The stator 1304 includes a pair of stator plate supports 1323-1 and 1323-2, a pair of stator plates 1324-1 and 1324-2, and a pair of dielectrics 1326-1 and 1326-2. The stator plate supports 1323 are mounted to the shaft 1307 and extend outwardly from the shaft 1307. In one embodiment of the present invention, the stator plate supports 1323 are tubular and have an annular wall on one side. The annular wall has a hole for passage of the shaft 1307 without mechanical contact between the shaft 1307 and the stator 1304. The opening of the stator plate supports 1323 is opposite the opening of the rotor plate supports 1320. The stator plates 1324-1 and 1324-2 are mounted on an outer surface of the tube of the respective stator plate supports 1323-1 and 1323-2. In one embodiment of the present invention, the stator plates 1324 are substantially perpendicular to the stator plate support 1323. The dielectrics 1326-1 and 1326-2 are mounted to respective stator plates 1324-1 and 1324-2 so that the corresponding dielectric 1326 is between the stator plate 1324 and the rotor plate 1322.

The dielectric 1326 is spaced apart from the corresponding rotor plate 1322 so that the shaft 1306 and the rotor 1302 may rotate without mechanical contact between the stator 1304 and the rotor 1302. The stator plate 1324-1 is mounted at a third distance from the longitudinal axis of the shafts 1306 and 1307. The third distance, according to one embodiment of the present invention, is less than the first distance so that the stator 1304 is inside the rotor 1302. In another embodiment of the present invention, the third distance is greater than the first distance so that the stator 1304 is outside the rotor 1302. In such an embodiment of the present invention, the rotor plate 1322 and the stator plate 1324 are on opposite surfaces of the tube of the respective plate support. The stator plate 1324-2 is a fourth distance from the longitudinal axis of the shaft 1307. The fourth distance is greater than the third distance. In one embodiment of the present invention, the fourth distance is less than the second distance so that the stator 1304 is inside the rotor 1302. In another embodiment of the present invention, the fourth distance is greater than the second distance so that the stator 1304 is outside the rotor 1302. In such an embodiment of the present invention, the stator plate 1324 and the rotor plate 1322 are on surfaces of the tubular walls of the plate supports that are opposite of those surfaces described above. The rotor plate 1322-1, the stator plate 1324-1 and the dielectric 1326-1 form a first capacitor. Likewise, the rotor plate 1322-2, the stator plate 1324-2 and the dielectric 1326-2 form a second capacitor. In this embodiment of the present invention, the capacitors are formed between the annular portions of a cylindrical surface.

By applying an electric voltage to the rotor plates 1322, an electric field across the formed capacitor transfer signals and power to the corresponding stator plate 1324 to thereby transfer signals and power between a rotating component and a non-rotating component of the electric machine. Although only two interleaved capacitors are shown, the present invention is not so limited. The interleaved rotating transformer 1300, for example, may include more than two capacitors formed by the rotor plates 1322, the stator plates 1324, and the dielectrics 1326.

What is claimed:

1. A system for transferring electrical signals, comprising:
    a first set of spaced electrically conductive annular plates substantially coaxial with an axis;
    a second set of spaced electrically conductive annular plates substantially concentric to the plates in said first set,
    said plates including pairs of adjacent radially spaced plates, each pair including a plate from the first set and a plate from the second set,
    one of the sets of plates being rotatable about said axis relative to the other set of plates;
    dielectric interposed each adjacent pair of plates, thereby defining a plurality of concentric capacitors with each capacitor having an input plate from the first set and an output plate from the second set;
    an input signal applied across the input plates; and
    an output signal sensed across the output plates in response to the input signal, the capacitors being connected in series with the input and output signals.

2. A system for transferring electrical signals, said system having an axis of rotation, comprising:
    a first set of spaced electrically conductive plates disposed either in substantially parallel or substantially perpendicular relation to said axis;
    a second set of spaced electrically conductive plates substantially parallel to the plates in said first set,
    said plates including pairs of adjacent spaced plates, each pair including a plate from the first set and a plate from the second set,
    one of the sets of plates being rotatable about said axis relative to the other set of plates;
    dielectric interposed each adjacent pair of plates, thereby defining a plurality of capacitors with each capacitor having a pair from the first set and a plate from the second set;
    an input signal source connected across the first set of plates; and
    an output signal sensor connected across the second set of plates and capable of sensing an output signal in response to the input signal.

3. A rotary apparatus for transferring electrical signals, said apparatus having an axis of rotation, comprising:
    a first set of spaced electrically conductive annular plates substantially coaxial with said axis;
    a second set of spaced electrically conductive annular plates substantially concentric to the plates in said first set,
    said plates including pairs of adjacent radially spaced plates, each pair including a plate from the first set and a plate from the second set,
    one of the sets of plates being rotatable about said axis relative to the other set of plates;
    dielectric interposed each adjacent pair of plates, thereby defining a plurality of concentric capacitors with each capacitor having a plate from the first set and a plate from the second set;
    an input charge being applied on the first set of plates; and
    an output charge being present on the second set of plates in response to the input charge,
    wherein said apparatus includes a first shaft and a second shaft,
    wherein the first set of plates is mounted on the first shaft, and
    wherein the second set of plates is mounted on the second shaft.

4. A capacitive rotary coupling system for transferring electrical signals, comprising:
    axially or radially spaced, coaxial, input and output capacitor plates interleaved either axially or radially of an axis of rotation;
    said plates including pairs of adjacent spaced plates, each pair including an input plate and an output plate;
    dielectric interposed each adjacent pair of plates, thereby defining a plurality of coaxial capacitors;

input terminals individually connected to the input plates;

output terminals individually connected to the output plates; and an input signal source connected across the input terminals, the input signal source, the capacitors, and the terminals being electrically connected in a series circuit, whereby an output signal is sensed across the output terminals in response to a signal applied to the input terminals from the input signal source.

5. A method of transferring electrical signals with a capacitive rotary coupling having an axis of rotation and including a set of spaced electrically conductive input plates disposed either in substantially parallel or substantially perpendicular relation to said axis; a set of spaced electrically conductive output plates substantially parallel to the input plates, there being pairs of adjacent spaced plates, each pair including an input plate and an output plate, one of the sets of plates being rotatable about said axis relative to the other set of plates; dielectric interposed each adjacent pair of plates, thereby defining a plurality of capacitors with each capacitor including an input late and an output plate, said capacitors being electrically connected in a series circuit, comprising:

applying an input signal across the input plates and in series circuit with both capacitors; and sensing an output signal across the output plates in response to the input signal.

6. The method of claim 5, including the further step of maintaining the value of the capacitors fixed during the transfer of signals from the input plates to the output plates.

7. A capacitive rotary coupling for transferring electrical signals, said coupling having an axis of rotation, comprising:

a set of spaced electrically conductive input plates disposed either in substantially parallel or substantially perpendicular relation to said axis;

a set of spaced electrically conductive output plates substantially parallel to the plates in said first set, said plates including pairs of adjacent spaced plates, each pair including one input plate and one output plate, one of the sets of plates being rotatable about said axis relative to the other set of plates;

dielectric interposed each adjacent pair of plates, thereby defining first and second capacitors with each capacitor thereby having an input plate and an output plate;

first and second input terminals respectively connected to said input plates;

an input signal source connected across the input terminals; and first and second output terminals respectively connected to said output plates, the input signal source, the terminals, and the capacitors being electrically connected in a series circuit.

8. The coupling of claim 7, wherein the plates are axially spaced.

9. The coupling of claim 7, wherein the plates are radially spaced.

10. The coupling of claim 7, wherein the plates are annular.

11. The coupling of claim 7, wherein the plates are interleaved.

12. The coupling of claim 7, wherein there are a pair of coaxial shafts; and wherein one of the sets of plates is mounted on one shaft and the other set of plates is mounted on the shaft.

13. The coupling of claim 7, wherein the capacitors do not change value during said relative rotation.

* * * * *